United States Patent [19]

Courty et al.

[11] 4,381,415

[45] Apr. 26, 1983

[54] PROCESS FOR DEALKYLATING AROMATIC HYDROCARBONS IN THE PRESENCE OF STEAM

[75] Inventors: Philippe Courty, Houilles, France; Georgy L. Rabinovich, Leningrad; Victor N. Mojaiko, Otradnoe, both of U.S.S.R.; Jean-François LePage, Rueil Malmaison, France

[73] Assignee: Institut Francais du Petrole, Rueil-Malmaison, France

[21] Appl. No.: 368,177

[22] Filed: Apr. 14, 1982

Related U.S. Application Data

[62] Division of Ser. No. 206,408, Nov. 12, 1980, Pat. No. 4,340,509.

[30] Foreign Application Priority Data

Nov. 12, 1979 [FR] France .............................. 79 28029

[51] Int. Cl.³ ............................................. C07C 4/12
[52] U.S. Cl. .................................................. 585/487
[58] Field of Search ................................ 585/486, 487

[56] References Cited

U.S. PATENT DOCUMENTS

4,199,436 4/1980 Courty ......................... 252/466 PT
4,199,437 4/1980 Courty et al. ................ 252/466 PT Primary Examiner—Curtis R. Davis
Attorney, Agent, or Firm—Millen & White

[57] ABSTRACT

Catalyst for dealkylating, in the presence of steam, a hydrocarbon charge, obtained for example from a catalytic reforming unit or from a unit for the production of aromatic hydrocarbons, and containing at least one alkylaromatic hydrocarbon such as toluene or a xylene, said catalyst containing an alumina carrier of a specific surface higher than 50 m²/g and, by weight with respect to the catalyst, from 0.1 to 2% of rhodium, from 0.05 to 2% of at least one metal selected from copper, silver and gold, from 0.05 to 2% of rhenium and from 0.02 to 5% of at least one additional metal selected from lithium, sodium, potassium, rubidium, cesium, beryllium, magnesium, calcium, strontium, barium and uranium.

20 Claims, No Drawings

PROCESS FOR DEALKYLATING AROMATIC HYDROCARBONS IN THE PRESENCE OF STEAM

This is a division of application Ser. No. 206,408, filed Nov. 12, 1980, now U.S. Pat. No. 4,340,509.

This invention, which has been developed in the laboratories of INSTITUT FRANCAIS DU PETROLE and VNII NEFTEKHIM of the Refining and Petrochemical Ministry of USSR (Leningrad) concerns dealkylation reactions in the presence of steam for manufacturing benzene or lower homologs thereof by dealkylating toluene and other alkylbenzenes.

Many catalysts have been proposed for the dealkylation of aromatic hydrocarbons in the presence of steam, which catalysts contain a porous carrier and at least one metal deposited on the carrier. By way of example there can be mentioned:

Russian Pat. No. 213 776 wherein the catalyst contains rhodium, nickel and alumina;

U.S. Pat. No. 3,595,932 wherein the catalyst contains a noble metal of the platinum family (platinum, palladium, rhodium, iridium, ruthenium) and a carrier consisting of alumina or combinations of alumina with nickel or cobalt;

U.S. Pat. No. 3,436,433 wherein the catalyst contains alumina, an alkali metal, ferric oxide, rhodium and chromium;

U.S. Pat. Nos. 3,649,706 and 3,649,707 wherein the catalysts contain mixtures of an alkali metal, ferric oxide, chromium and a metal selected from platinum, palladium and rhodium;

U.S. Pat. No. 4,013,734 wherein the catalyst contains alumina, a noble metal of the platinum family and a metal selected from vanadium, niobium and tantalum;

French Pat. No. 2 317 962 wherein the catalyst contains alumina or aluminosilicates in addition to rhodium and a metal from group IV A, particularly tin;

U.S. Pat. No. 4,199,436 to the applicant, wherein the catalyst contains alumina, at least one alkali metal, at least one metal selected from copper, silver and gold and at least one noble metal of the platinum family;

U.S. Pat. No. 4,199,437 to the applicant, wherein the catalyst contains alumina, at least one alkali metal, from 0.05 to 2% of rhenium and at least one noble metal of the platinum family.

The catalysts described and used up to now perform rather well but they do not simultaneously yield a high activity, a sufficient stability and a high selectivity to aromatic hydrocarbons.

As a matter of fact, in addition to the conversion of alkylaromatics to benzene, side reactions of hydrocracking and/or steam cracking of the aromatic ring are observed, which lead to the formation of undesirable gaseous products such as CO, $CO_2$, $CH_4$, thereby reducing the hydrogen yield and the yield of aromatics.

Moreover, the lack of stability of the catalyst according to the prior art makes it necessary to increase of the reactor temperature frequently, thus leading to too short cycles.

An object of the present invention is to avoid these major disadvantages by providing a process whereby the yield of final product may be increased by the use of selective and stable catalysts.

This object is attained by preparing benzene and/or higher homologs thereof by dealkylating alkylbenzenes (toluene, xylenes, etc.) by conversion with the use of steam in the presence of specific catalysts.

The operating conditions comprise generally a temperature from 300° to 600° C., preferably from 400° to 500° C. and a pressure from 1 to 20 atmospheres, preferably from 3 to 10 atmospheres, with a LHSV ("Liquid Hourly Space Velocity") i.e. a liquid VVH (Space velocity) from 0.1 to 10 volumes of hydrocarbons per volume of catalyst and per hour, preferably from 1 to 5, with a molar ratio $H_2O$/hydrocarbons from 1 to 20, preferably from 2 to 10.

In the course of the process, there are obtained products formed by total dealkylation such as benzene, as well as products formed by partial dealkylation such, as for example, toluene from xylenes.

More precisely, the process provides for the production of benzene, toluene, xylenes, ethylbenzene and substantial quantities of hydrogen. According to the process, it is possible, for example, to dealkylate toluene, xylenes, ethylbenzene, propylbenzene or even hydrocarbons with condensed rings, such as alkylnaphthalenes, alkylphenanthrenes, alkylanthracenes, etc. There can also be mentioned mesitylene, pseudo cumene, hemimellitene; according to the process it is also possible to aromatize and subsequently dealkylate such hydrocarbons as alkylcyclohexanes, alkyltetralines, alkyldecalines, and alkyldihydroanthracenes.

The process is particularly useful for dealkylating alkylaromatic hydrocarbons obtained in the reactions of catalytic reforming or of producing aromatic hydrocarbons ("Aromizing"), as well as aromatic cuts obtained by steam cracking.

Preferably, the charges do not contain more than 1 mg/l of sulfur and, if possible, not more than 0.5 mg/l of total sulfur ($H_2S$+sulfides).

The catalysts according to the invention provide for high yields of dealkylated aromatics (for example, high yields of benzene) simultaneously with a small rate of degradation of the aromatic ring. They produce a reaction gas of high hydrogen content (from about 50 to about 70% by volume of hydrogen) which can be easily upgraded. Finally they show an excellent stability under the most severe operating conditions.

Moreover, in an unexpected manner, the catalysts of the invention show a particularly high dehydrocyclizing activity. When the charges contain $C_6^+$ paraffins, $C_6^+$ isoparaffins and $C_6^+$ naphthenes, these various compounds are partly converted to aromatic hydrocarbons. In the presence of such charges, containing, for example, at least 5% of a mixture of naphthenes and paraffins, the molar yield to aromatic hydrocarbons, expressed in benzene equivalents, is at least 100% and is generally from 100 to 110%.

The specific catalysts, used according to the invention, contain:

(a) a carrier, consisting essentially of alumina and, by weight:

(b) from 0.1 to 2% of rhodium, (c) from 0.05 to 2% of at least one metal from group $I_B$ of the periodic classification of elements, selected from the group consisting of copper, silver and gold, this metal acting as activator, (d) from 0.05 to 2% of rhenium acting as selectivity improver, (e) from 0.02 to 5% of at least one additional metal selected from the group consisting of lithium, sodium, potassium, rubidium, cesium, beryllium, magnesium, calcium, strontium, barium and uranium, this or these metals acting as stability and selectivity improvers.

Preferably, the catalysts according to the invention contain:

(a) an alumina carrier of specific surface higher than 50 m² per gram and, preferably higher than 80 m² per gram;

and, by weight:

(b) from 0.1 to 1% of rhodium with optionally in addition 0.1 to 1% of at least one other metal selected from the group consisting of platinum, palladium, iridium, ruthenium and osmium, (c) from 0.05 to 1% of at least one metal selected from the group consisting of copper, silver and gold, the preferred metals being copper and silver, (d) from 0.1 to 0.9% of rhenium, and (e) from 0.1 to 3.5% of at least one metal, called additional metal, selected from lithium, sodium, potassium, rubidium, cesium, beryllium, magnesium, calcium, strontium, barium and uranium, the preferred metals being uranium, barium, strontium, calcium, magnesium, lithium, potassium and rubidium.

Preferably, when the catalyst simultaneously contains rhodium and another metal from group VIII selected from platinum, palladium, iridium, ruthenium and osmium, the rhodium amounts to 20-80% by weight of the total weight of the metals from group VIII contained in the catalyst.

A first type of catalysts more particularly preferred, comprises those which contain:

(a) an alumina carrier of specific surface higher than 50 m² per gram and preferably higher than 80 m² per gram, and, by weight:

(b) from 0.25 to 0.70% of rhodium, (c) from 0.05 to 0.6% of copper, (d) from 0.2 to 0.7% of rhenium, and (e) from 0.1 to 1% of potassium and from 0.2 to 3% of at least one metal selected from uranium, barium, magnesium, calcium, lithium strontium and rubidium.

Another type of catalysts, more particularly preferred, comprises those which contain:

(a) an alumina carrier of specific surface higher than 50 m² per gram and preferably higher than 80 m² per gram and, by weight:

(b) from 0.1 to 0.6% of rhodium and optionally from 0.1 to 0.6% of at least one other noble metal selected from the group consisting of platinum and palladium, ruthenium (c) either 0.05 to 6% of copper and/or silver, or from 0.2 to 0.9% of gold, (d) 0.2 to 0.6% of rhenium, and (e) from 0.1 to 0.5% of potassium, 0.05 to 1% of magnesium and 0.7 to 3% of at least one other metal selected from uranium, barium, calcium, strontium, lithium and rubidium.

The carrier of the catalysts according to the invention is preferably selected from aluminas of the following type: eta-cubic $\eta$, gamma-cubic $\gamma_C$, gamma tetragonal $\gamma_T$, Chi $\chi$-cubic, Kappa-orthorhombic $\kappa$, theta-monoclinic $\theta$, delta-orthorhombic $\delta$ and rho-amorphous $\rho$.

It has a specific surface from 50 to 400 m²/g and preferably from 80 to 350 m²/g and a total pore volume from 30 to 150 ml/100 g.

The method of manufacture of the catalysts is not a critical feature of the invention and any known method may be used. The active elements will be deposited either simultaneously or separately on the carrier by impregnation from an aqueous solution, or in an appropriate solvent, of soluble salts of the above-mentioned active elements.

The manufacture of the catalysts may be based on the methods mentioned in the U.S. Pat. Nos. 4,199,436 and 4,199,437, already mentioned.

The following non-limitative examples are given for illustrating the various aspects of the invention.

These examples concern the manufacture of the catalysts according to the invention and their use in the reaction of toluene dealkylation in the presence of steam. The use of the catalysts is not limited to this particular hydrocarbon, which has been selected for testing the activity and the selectivity of the catalysts in the reaction of dealkylation in the same manner as normal-heptane is selected for testing the properties of the reforming catalysts, or ethylbenzene for the catalysts used for isomerizing aromatic hydrocarbons. As stated above, various charges of alkylaromatic hydrocarbons may be used.

The preparation of catalysts A, A', B, B' and C to J is first described, the catalysts A, A', B, B' and I forming no part of the invention.

EXAMPLE 1

(comparative example)

There is used a commercial alumina carrier $\gamma_c$, consisting of balls having a diameter from 1.6 to 2.5 millimeters, a specific surface of 200 m²/g and a pore volume of 60 ml/100 g, previously heated at 80° C. in the presence of saturating steam.

An amount equivalent to 1000 g of dry carrier, is contacted with 2000 ml of an aqueous solution S containing 6.0 g of rhodium as hydrated rhodium trichloride and 55 ml of hydrochloric acid of a purity grade suitable for analyses ($d_{20° C.}=1.19$). After exhaustion of the solution, it is observed that the rhodium is distributed homogeneously in the balls. The catalyst is dried at 50° C. for 3 hours, then at 100° C. for 3 further hours and at 200° C. for 3 hours. The catalyst is then placed in a bowl granulator and is impregnated with 600 ml of an aqueous solution S' containing 8.4 g of ammonium perrhenate, 12.5 ml of pure hydrochloric acid and 12.5 g of calcium nitrate. The catalyst is then treated for 2 hours at 50° C. in a stove and then for 3 hours at 100° C. and 5 hours at 200° C. It is reduced in a hydrogen stream at 550° C. for 3 hours (G.H.S.V. hydrogen=300 volumes/volume of catalyst/hour). The catalyst is finally impregnated with 40 g of potassium nitrate dissolved in 550 ml of water (solution S"), dried as precedingly and then roasted in dry air at 400° C. for 3 hours.

The catalyst (catalyst A) contains, by weight, 0.58% of rhodium, 0.57% of rhenium, 1.5% of potassium and 0.3% of calcium. Similarly there is prepared a catalyst A', without calcium, in conformity with the U.S. Pat. No. 4,199,437, containing 0.58% of rhodium, 0.57% of rhenium and 1.8% of potassium.

EXAMPLE 2

(comparative example)

Example 1 is repeated, except that the solution S' is replaced by 600 ml of a solution containing 16.20 g of copper chloride di-hydrate, 8.5 ml of pure hydrochloric acid and 12.5 g of calcium nitrate.

The obtained catalyst (catalyst B) contains, by weight, 0.58% of rhodium, 0.57% of copper, 1.5% of potassium and 0.3% of calcium. Similarly, there is prepared a catalyst B', without calcium, in conformity with the U.S. Pat. No. 4,199,436, containing 0.58% of rhodium, 0.57% of copper and 1.8% of potassium.

EXAMPLE 3

(according to the invention)

Example 1 is repeated, except that the solution S' is replaced by 600 ml of a solution containing 8.4 g of ammonium perrhenate, 9.4 g of copper chloride dihydrate, 12.5 ml of pure hydrochloric acid and 20.8 g of calcium nitrate. There is subsequently used in the present case 26.7 g of potassium nitrate.

The obtained catalyst (catalyst C) contains, by weight: 0.58% of rhodium, 0.57% of rhenium, 0.33% of copper, 0.5% of calcium and 0.97% of potassium.

EXAMPLE 4

There is used a $\gamma_c$ and $\gamma_T$ alumina carrier consisting of extrudates having a diameter of 1.2 mm, lengths from 4 to 7 mm, a specific surface of 250 m$^2$/g and a total pore volume of 55 ml/100 g, previously moistened at 80° C. in an oven (steam pressure=saturating steam pressure).

An amount equivalent to 1000 g of dry carrier is impregnated with 1600 ml of an aqueous solution containing 4.07 g of rhodium as rhodium trichloride and 60 ml of pure hydrochloric acid ($d_{20° C.}=1.19$).

After a contact period of 5 hours, the impregnated carrier is drained, dried at 50° C., then at 100° C., then at 150° C. and finally at 200° C. for 3 hours at each indicated temperature; then the carrier is impregnated in a bowl granulator with 520 ml of an aqueous solution T containing 8.40 g of ammonium perrhenate, 9.5 g of copper chloride dihydrate, 14 ml of hydrochloric acid, 30 g of citric acid mono-hydrate and 22.8 g of uranyl nitrate hexahydrate. The catalyst mass is then dried as precedingly mentioned, roasted for 4 hours at 150° C. and then reduced in the presence of water with a gas mixture of $N_2$ with $H_2$ in respective proportions of 90%–10% at 580° C. for 5 hours. The reduced catalyst is finally impregnated with 5.20 g of potassium nitrate and 42.4 g of magnesium nitrate dissolved in 500 ml of water, then dried as above indicated, then roasted in air at 300° C. for 1 hour and at 400° C. for 1 hour.

The obtained catalyst (catalyst D) contains, by weight, 0.40% of rhodium, 0.56% of rhenium, 0.33% of copper, 0.4% of magnesium, 0.2% of potassium and 1.06% of uranium.

EXAMPLE 5

The preparation of example 4 is reproduced, except that the 520 ml of solution T are replaced with 520 ml of solution T' containing 7.64 g of ammonium perrhenate, 9.5 g of copper chloride dihydrate, 23.05 g of barium nitrate, 12 g of malic acid, 8 ml of hydrochloric acid and 53 g of magnesium nitrate.

The final catalyst (catalyst E) contains, by weight, 0.40% of rhodium, 0.51% of rhenium, 0.33% of copper, 0.5% of magnesium and 1.21% of barium.

EXAMPLE 6

The alumina carrier in balls, of examples 1 to 3, is used.

An amount equivalent to 1000 g of dry carrier is impregnated with 4.07 g of rhodium as trichloride, 50 ml of hydrochloric acid of a purity grade suitable for analyses ($d_{20° C.}=1.19$) and 10.4 g of ammonium perrhenate in 2000 ml of aqueous solution.

After a contact period of 6 hours, the carrier is drained and dried at 50° C. for 5 hours, at 100° C. for 3 hours and at 200° C. for 5 hours; the mother liquors which contain residual rhenium are recovered. The dry carrier is then reduced in a hydrogen/nitrogen mixture (50/50) at a G.H.S.V. of 400 volumes/volume of catalyst/hour, for 1 hour at 200° C., then for 2 hours at 400° C. and for 3 hours at 560° C. After cooling and passivation with industrial nitrogen (1% $O_2$, 99% $N_2$), the product is impregnated with 590 ml of an aqueous solution containing 88 g of magnesium nitrate, 20 g of strontium nitrate, 9.4 g of copper nitrate di-hydrate and 19 g of citric acid mono-hydrate.

After drying as above mentioned and roasting in industrial nitrogen at 400° C. for 2 hours, the obtained catalyst (catalyst F) contains, by weight, 0.40% of rhodium, 0.51% of rhenium, 0.33% of copper, 0.8% of strontium and 0.91% of magnesium.

EXAMPLE 7

The balls of alumina carrier of examples 1 to 3 are used in this example.

An amount equivalent to 1000 g of dry carrier is contacted with 2200 ml of solution S containing 4.1 g of rhodium as rhodium trichloride and 57 ml of hydrochloric acid of a purity grade suitable for analyses ($d_{20° C.}=1.19$) for 5 hours. The catalyst is then drained dried at 80° C. for 5 hours, then at 220° C. for 3 hours, and then impregnated in a bowl granulator by means of 590 ml of solution S' containing 7.45 g of ammonium perrhenate, 15.5 g of copper nitrate hexahydrate, 32.5 g of uranyl nitrate hexahydrate and 40 g of citric acid monohydrate. After 3 hours of maturation in ambient air, drying at 50° C. for 2 hours, then at 120° C. for 3 hours and at 240° C. for 1 hour, the catalyst is finally roasted at 320° C. for 2 hours and then reduced in hydrogen atmosphere at 500° C. for 6 hours.

The final catalyst (catalyst G) contains, by weight, 0.40% of rhodium, 0.51% of rhenium, 0.54% of copper and 1.5% of uranium.

EXAMPLE 8

A commercial alumina carrier $\gamma_c$ consisting of balls of a diameter from 1.8 to 2.5 mm, of a specific surface of 190 m$^2$/g and a pore volume of 70 ml/100 g, previously moistened in an oven, is impregnated as follows:

An amount equivalent to 1000 g of dry carrier is contacted with 2500 ml of a solution containing 4.1 g of rhodium as trichloride and 52 ml of hydrochloric acid of a purity grade suitable for analyses ($d_{20° C.}=1.19$); after 5 hours of slow stirring, the carrier is drained, dried at 80° C. for 5 hours then at 150° C. for 2 hours and at 240° C. for 3 hours and then contacted with 1.60 g of platinum as chloroplatinic acid, 7.85 g of ammonium perrhenate and 25 ml of pure hydrochloric acid in 2000 ml of aqueous solution; after a contact period of 6 hours, the carrier is drained, the mother-liquors which contain rhenium are recovered. The product is finally dried as previously and reduced in a mixture of hydrogen and nitrogen (20–80) at 300° C. for 2 hours and then at 550° C. for 5 hours.

After reduction, the catalyst is finally impregnated with 680 ml of a solution containing 9.5 g of silver nitrate, 15 g of glycolic acid, 22.88 g of barium nitrate and 5.3 g of potassium nitrate, then matured in air for 5 hours, dried as above-mentioned and finally activated in industrial nitrogen (1% $O_2$–99% $H_2$) at 450° C. for 6 hours.

The final catalyst (catalyst H) contains, by weight, 0.4% of rhodium, 0.15% of platinum, 0.6% of silver, 0.40% of rhenium, 1.2% of barium and 0.2% of potassium.

EXAMPLE 9

(comparative example)

The preparation of example 7 is repeated, but with 6.3 g of rhodium as trichloride and with an impregnating solution S' (590 ml) exclusively containing 50.9 g of uranyl nitrate hexahydrate and 40 g of citric acid monohydrate; the remainder of the preparation is exactly identical to that indicated in example 7. The final catalyst (catalyst I) contains by weight 0.60% of rhodium and 2.35% of uranium.

EXAMPLE 10

The carrier described in example 1 is used again. 2000 ml of aqueous solution containing 4.07 g of rhodium as trichloride, 2.1 g of palladium as chloride and 40 ml of pure hydrochloric acid ($d_{20° C.}=1.19$) are contacted with an amount equivalent to 1000 g of dry carrier. After 5 hours during which the solution flows through a tube filled with an alumina carrier, the carrier is drained, dried at 50° C., then at 100° C., then at 150° C., then at 200° C. for 2 hours at each of the mentioned temperatures; then it is placed in a bowl granulator and impregnated with 550 ml of aqueous solution containing 4.6 g of gold as trichloride and 5.8 g of ammonium perrhenate; the preceding drying step is reproduced; the catalyst is roasted in air at 400° C. for 2 hours and then impregnated with 550 ml of aqueous solution containing 26.7 g of potassium nitrate and 19.5 g of rubidium nitrate, then dried as above mentioned and finally reduced under hydrogen, at 540° C. for 6 hours.

The final catalyst (catalyst J) contains, by weight, 0.4% of rhodium, 0.2% of palladium, 0.45% of gold, 0.40% of rhenium, 1% of potassium and 0.5% of rubidium.

EXAMPLE 11

Table I indicates the performances obtained in the test reaction of toluene dealkylation to benzene, with catalysts A, B and C. Catalysts A and B form no part of the invention.

The operating conditions of the test are the following:
Pressure: 7 atmospheres
L.H.S.V.=2 volumes of charge/catalyst volume/hour
$H_2O$/charge=5 moles/mole The initial activity is determined after 100 hours of run.

The charge consists (in moles) of toluene (97%) and xylenes (3%) and contains 0.2 ppm of sulfur. The unconverted xylenes and toluene are recycled to the reactor.

The molar conversion of the charge C is defined by the following formula:

$$\text{conversion} = 100 \frac{(\text{toluene} + \text{xylenes}) \text{ input} - (\text{toluene} + \text{xylenes}) \text{ output}}{(\text{toluene} + \text{xylenes}) \text{ input}}$$

The temperature required for obtaining a 70% molar conversion rate of the charge is indicated in Table I.

The selectivity to benzene, S, is defined by the formula $$\text{selectivity} = 100 \times \frac{\text{formed benzene (moles)}}{\text{converted toluene and xylenes (moles)}}$$

The molar yield to benzene $R_{BZ}$ is equal to the product of the conversion rate by the selectivity.

The amount of degraded aromatic rings ($R_{DEG}$) is equal to the difference between the conversion C and the yield to benzene $R_{BZ}$.

$$R_{DEG} = C - R_{BZ}$$

TABLE I

| EXAMPLE No. | CATALYST No. | COMPOSITION ACTIVE PHASE (% b.w.) | T °C. FOR A 70% CONVERSION | | STABILITY S °C./1000 h | S SELECTIVITY TO BENZENE (C = 70% t = 100 h) | $B_{BZ}$ MOLAR YIELD TO BENZENE | $R_{DEG}$ DEGRADED AROMATIC RINGS % |
|---|---|---|---|---|---|---|---|---|
| | | | t = 100 h | t = 1100 h | | | | |
| 1 | A | 0.58 Rh—0.57 Re 1.5 K—0.3 Ca | 475 | 496 | 21 | 95.8 | 67.06 | 2.94 |
| 1 | A' | 0.58 Rh—0.57 Re—1.8 K | 475 | 497 | 21 | 95.9 | 67.04 | 2.95 |
| 2 | B | 0.58 Rh—0.57 Cu 1.5 K—0.3 Ca | 446 | 472 | 26 | 94.6 | 66.22 | 3.84 |
| 2 | B' | 0.58 Rh—0.57 Cu—1.8 K | 446 | 471 | 26 | 94.5 | 66.20 | 3.85 |
| 3 | C | 0.58 Rh—0.57 Re 0.33 Cu—0.97 K 0.5 Ca | 461 | 471 | 12 | 97.2 | 67.93 | 2.01 |

The stability of the catalysts, expressed by S °C./1000 hours, indicates the extent of the temperature increase in the reactor required to maintain the molar conversion rate to 70% for 1000 hours of stabilized operation.

Table I shows that the catalysts A, A', B and B' of the above-described prior art do not perform as well as the catalyst C which simultaneously contains copper and rhenium.

As a matter of fact, this latter catalyst is more selective than catalysts A, A', B and B'; accordingly, at a conversion rate of 70%, the degradation of the aromatic ring is much smaller with catalyst C; this catalyst C is also more stable than the catalysts of the prior art. Catalyst C also exhibits an activity (temperature required for a conversion rate of 70%) close to that of the most active catalysts of the prior art.

EXAMPLE 12

The catalysts of examples 4 to 10 are tested in the conditions of example 11 with the same charge as in example 11. The catalyst of example 9 (catalyst I) does not concern the invention; Table II summarizes the obtained results expressed in the same manner as in example 11.

TABLE II

| EX-AMPLE No. | CATA-LYST No. | COMPOSITION ACTIVE PHASE (% b.w.) | T °C. FOR A 70% CONVERSION (C) t = 100 h | T °C. FOR A 70% CONVERSION (C) t = 1100 h | STABILITY S °C./1000 h | S MOLAR SELECTIVITY TO BENZENE t = 100 h c = 70% | $R_{BZ}$ MOLAR YIELD TO BENZENE t = 100 h | $R_{DEG}$ DEGRADED AROMATIC RINGS % |
| --- | --- | --- | --- | --- | --- | --- | --- | --- |
| 4 | D | 0.40 Rh—0.56 Re—0.4 Mg 0.33 Cu—0.2 K—1.06 U. | 455 | 466 | 11 | 97.7 | 68.5 | 1.6 |
| 5 | E | 0.40 Rh—0.51 Re—0.33 Cu 0.5 Mg—1.21 Ba | 460 | 472 | 12 | 97.6 | 68.3 | 1.7 |
| 6 | F | 0.40 Rh—0.51 Re—0.33 Cu 0.91 Mg—0.8 Sr | 455 | 468 | 13 | 97.5 | 68.2 | 1.8 |
| 7 | G | 0.40 Rh—0.51 Re—0.54 Cu 1.5 U | 452 | 463 | 11 | 97.4 | 68.45 | 1.65 |
| 8 | H | 0.40 Rh—0.15 Pt—0.40 Re 0.6 Ag—1.2 Ba—0.2 K | 459 | 475 | 16 | 98.1 | 68.7 | 1.41 |
| 9 | I | 0.60 Rh—2.35 U | 488 | 519 | 31 | 88.5 | 61.95 | 8.04 |
| 10 | J | 0.40 Rh—0.2 Pd—0.40 Re 0.45 Au—1 K—0.5 Rb | 464 | 479 | 15 | 97.0 | 67.9 | 1.2 |

The comparison of the performances of catalysts G and I shows that the addition of rhenium and copper (catalyst G) to the rhodium-uranium pair (catalyst I of the prior art) provides unexpectedly a far better activity (much lower temperature for a 70% conversion rate), a far better selectivity (nearly 9 points better) and stability (by passing from 31° to 11° C./1000 hours).

Similar results have been obtained by adding the rhenium-silver and rhenium-gold pairs.

The performances of the catalysts of the following other examples illustrate the various aspects of the invention.

EXAMPLE 13

This example illustrates the dehydrocyclizing properties of the catalysts of the invention, by means of a new series of tests performed with catalysts A, B, C, G, I, in the conditions of example 11, with a synthetic charge containing by mole:

aromatic rings formed is greater than the number of converted aromatic rings. This results from the dehydrocyclization of heptane to aromatic rings, in the conditions of the test. Accordingly, the selectivity is higher than 100%.

With catalysts B and I, the operation in presence of paraffins results in a decrease of the activity without improving the selectivity.

Catalyst A exhibits the same dehydrocyclizing properties as the catalysts of the invention, but is less active and less stable.

Similar results have been obtained with $C_6$–$C_{10}$ paraffinic cuts and with the Re-Ag and Re-Au metal pairs.

It is to be observed in all the examples and as a general rule, that the dealkylation catalysts ready for use preferably contain from 0.1 to 4% by weight and, more particularly from 0.1 to 2% of halogen with respect to the mass of the dry catalyst. The preferred halogen is generally chlorine.

TABLE III

| EX-AMPLE No. | CATA-LYST No. | COMPOSITION ACTIVE PHASE (% b.w.) | T °C. for a 70% CONVERSION t = 100 h | SELECTIVITY TO BENZENE t = 100 h | YIELD TO BENZENE | T °C. for a 70% CONVERSION t = 100 h | SELECTIVITY TO BENZENE | YIELD TO BENZENE |
| --- | --- | --- | --- | --- | --- | --- | --- | --- |
| | | | toluene + xylenes charge (Examples 11,12) | | | toluene + n $C_7$ + xylene charge (Example 13) | | |
| 1 | A | 0.58 Rh—0.57 Re 1.5 K—0.3 Ca | 475 | 95.8 | 67.06 | 483 | 101 | 70.7 |
| 2 | B | 0.58 Rh—0.57 Cu 1.5 K—0.3 Ca | 446 | 94.6 | 66.22 | 470 | 94.1 | 65.8 |
| 3 | C | 0.58 Rh—0.57 Re 0.33 Cu—0.97 K—0.5 Ca | 461 | 97.2 | 67.93 | 466 | 102 | 71.5 |
| 7 | G | 0.40 Rh—0.51 Re 0.54 Cu—1.5 U | 452 | 97.4 | 68.45 | 457 | 102.6 | 71.76 |
| 9 | I | 0.6 Rh—2.35 U | 488 | 88.5 | 61.95 | 503 | 87.9 | 61.50 | toluene: 88.2%; xylenes: 2.7%; n-heptane: 9.1%

In all of these tests, more than 99.5% of the n-heptane is converted. Unconverted toluene and xylenes are recycled to the reactor.

Table III summarizes the resuls of these tests.

On the same Table are reported the results of the tests according to examples 11 and 12, with the toluene-xylenes mixtures.

The conversion, selectivity and yield are expressed in accordance with the preceding definitions; n-heptane accordingly is not involved in these computations.

With the catalysts A, C and G, it is unexpectedly observed that the benzene yield is higher than the conversion rate of the charge; therefore, the number of

What is claimed is:

1. In a process for dealkylating, in the presence of steam, at least one alkyl aromatic hydrocarbon, the improvement which comprises conducting the process in the presence of a catalyst containing (a) an alumina carrier and, by weight with respect to the catalyst, (b) from 0.1 to 2% of rhodium, (c) from 0.05 to 2% of at least one metal from group I B of the periodic classification of elements, selected from copper, silver and gold, (d) from 0.05 to 2% of rhenium and (e) from 0.02 to 5% of at least one additional metal selected from lithium, sodium, potassium, rubidium, cesium, beryllium, magnesium, calcium, strontium, barium and uranium.

2. A process according to claim 1, said catalyst containing, by weight with respect to the catalyst:
   from 0.1 to 1% of rhodium;
   from 0.05 to 1% of at least one metal selected from copper, silver and gold;
   from 0.1 to 0.9% of rhenium, and
   from 0.1 to 3.5% of at least one additional metal selected from lithium, sodium, potassium, rubidium, cesium, beryllium, magnesium, calcium, strontium, barium and uranium, the catalyst carrier having a specific surface higher than 50 $m^2/g$.

3. A process according to claim 1, said catalyst further containing from 0.1 to 1% by weight of at least one other metal from group VIII selected from ruthenium, palladium, osmium, iridium and platinum.

4. A process according to claim 2, wherein the additional metal is uranium.

5. A process according to claim 3, wherein rhodium amounts to 20–80% by weight of the total weight of the group VIII metals contained in the catalyst.

6. A process according to claim 2, said catalyst containing:
   (a) an alumina carrier of a specific surface higher than 80 $m^2/g$ and, by weight with respect to the catalyst:
   (b) from 0.25 to 0.70% of rhodium,
   (c) from 0.05 to 0.6% of copper,
   (d) from 0.2 to 0.7% of rhenium,
   (e) from 0.1 to 1% of potassium and from 0.2 to 3% of at least one metal selected from uranium, barium, calcium, strontium, lithium and rubidium.

7. A process according to claim 2, said catalyst containing:
   (a) an alumina carrier of specific surface higher than 80 $m^2/g$; and, by weight with respect to the catalyst:
   (b) from 0.1 to 0.6% of rhodium;
   (c) from 0.05 to 0.6% of at least one metal selected from copper and silver;
   (d) from 0.2 to 0.5% of rhenium, and
   (e) from 0.1 to 0.5% of potassium, 0.05 to 1% of magnesium and 0.7 to 3% of at least one other metal selected from uranium, barium, calcium, strontium, lithium and rubidium.

8. A process according to claim 7, said catalyst further containing from 0.1 to 0.6% of at least one metal selected from platinum, palladium and ruthenium.

9. A process according to claim 1, wherein said group I B metal is copper.

10. A process according to claim 2, wherein said group I B metal is copper.

11. A process according to claim 3, wherein said group I B metal is copper.

12. A process according to claim 4, wherein said group I B metal is copper.

13. A process according to claim 5, wherein said group I B metal is copper.

14. A process according to claim 6, wherein said group I B metal is copper.

15. A process according to claim 7, wherein said group I B metal is copper.

16. A process according to claim 8, wherein said group I B metal is copper.

17. A process according to claim 9, wherein the additional metal comprises potassium.

18. A process according to claim 10, wherein the additional metal comprises potassium.

19. A process according to claim 11, wherein the additional metal comprises potassium.

20. A process according to any one of claims 1, 2, 3, 4, 5, 6, 7, 8, 9, 10, 11, 12, 13, 14, 15, 16, 17, 18 or 19, wherein the at least one alkyl aromatic hydrocarbon is toluene, thereby producing benzene.

* * * * *